(12) United States Patent
Sutkus et al.

(10) Patent No.: US 10,016,934 B2
(45) Date of Patent: Jul. 10, 2018

(54) AUTOMATED FABRICATION OF COMPOSITE FILLERS

(71) Applicant: The Boeing Company, Chicago, IL (US)

(72) Inventors: Donald J. Sutkus, Mercer Island, WA (US); Sandie H. Cheung Hallman, Seattle, WA (US); Courtney M. Fix, Normandy Park, WA (US); Douglas A. McCarville, Bonney Lake, WA (US)

(73) Assignee: The Boeing Company, Chicago, IL (US)

( * ) Notice: Subject to any disclaimer, the term of this patent is extended or adjusted under 35 U.S.C. 154(b) by 159 days.

(21) Appl. No.: 15/225,823

(22) Filed: Aug. 1, 2016

(65) Prior Publication Data

US 2016/0339629 A1 Nov. 24, 2016

Related U.S. Application Data

(62) Division of application No. 14/045,270, filed on Oct. 3, 2013, now Pat. No. 9,415,577.

(51) Int. Cl.
| | |
|---|---|
| *B29C 65/70* | (2006.01) |
| *B32B 38/00* | (2006.01) |
| *B29C 70/52* | (2006.01) |
| *B29D 99/00* | (2010.01) |
| *B32B 38/10* | (2006.01) |

(52) U.S. Cl.
CPC .............. *B29C 65/70* (2013.01); *B29C 70/52* (2013.01); *B29C 70/526* (2013.01); *B29D 99/0003* (2013.01); *B29D 99/0007* (2013.01); *B32B 38/0012* (2013.01); *B32B 38/0004* (2013.01); *B32B 38/10* (2013.01); *B32B 2305/076* (2013.01); *B32B 2605/18* (2013.01); *Y10T 156/1008* (2015.01)

(58) Field of Classification Search
CPC ....... B29C 65/70; B29C 70/52; B29C 70/526; B32B 38/0012; B29D 99/0003
USPC ................................................. 156/461, 463
See application file for complete search history.

(56) References Cited

U.S. PATENT DOCUMENTS

| | | |
|---|---|---|
| 4,117,054 A | 9/1978 | Salo |
| 4,269,140 A | 5/1981 | Burns et al. |
| 4,559,005 A | 12/1985 | Gants et al. |
| 4,789,594 A | 12/1988 | Stawski |
| 4,988,278 A | 1/1991 | Mills |
| 5,211,965 A | 5/1993 | Kitagawa |

(Continued)

FOREIGN PATENT DOCUMENTS

| | | |
|---|---|---|
| EP | 0356449 B1 | 6/1992 |
| WO | WO8808367 A1 | 4/1988 |
| WO | WO2005011961 A1 | 7/2004 |

OTHER PUBLICATIONS

Olberg et al., "Method and Apparatus for Making Composite Fillers," U.S. Appl. No. 14/045,195, filed Oct. 3, 2013, 39 pages.

(Continued)

*Primary Examiner* — Philip C Tucker
*Assistant Examiner* — John Blades
(74) *Attorney, Agent, or Firm* — Yee & Associates, P.C.

(57) ABSTRACT

A composite radius filler having a varying cross-sectional shape is pre-conditioned before being pultruded through forming dies. The composite filler radius filler includes a tab ply having a varying width that is laminated onto a supporting, full width base ply.

18 Claims, 16 Drawing Sheets

(56) References Cited

U.S. PATENT DOCUMENTS

| | | | |
|---|---|---|---|
| 5,311,814 | A | 5/1994 | Kierson |
| 5,501,145 | A | 3/1996 | Fromm |
| 6,562,436 | B2 | 5/2003 | George et al. |
| 6,709,538 | B2 | 3/2004 | George et al. |
| 9,415,577 | B1 | 8/2016 | Sutkus et al. |
| 2010/0024966 | A1 | 2/2010 | Felip |
| 2011/0049750 | A1 | 3/2011 | Bechtold |
| 2013/0105072 | A1 | 5/2013 | Anderson et al. |
| 2013/0134621 | A1 | 5/2013 | Tsotsis et al. |

OTHER PUBLICATIONS

Office Action, dated Feb. 10, 2017, regarding U.S. Appl. No. 14/045,195, 32 pages.

Office Action, dated Jun. 23, 2015, regarding U.S. Appl. No. 14/045,270, 11 pages.

Final Office Action, dated Jan. 29, 2016, regarding U.S. Appl. No. 14/045,270, 9 pages.

Notice of Allowance, dated Apr. 12, 2016, regarding U.S. Appl. No. 14/045,270, 7 pages.

Notice of Allowance, dated Aug. 24, 2017, regarding U.S. Appl. No. 14/045,195, 7 pages.

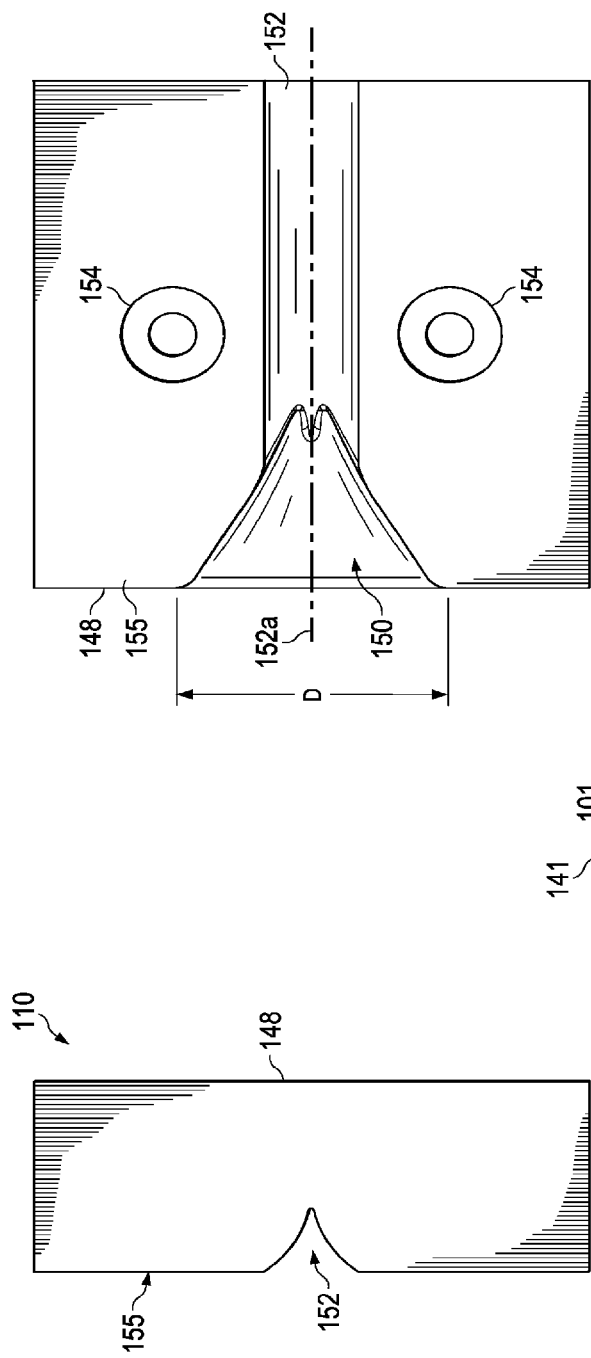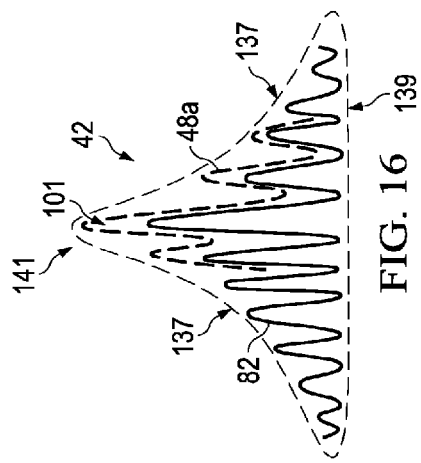

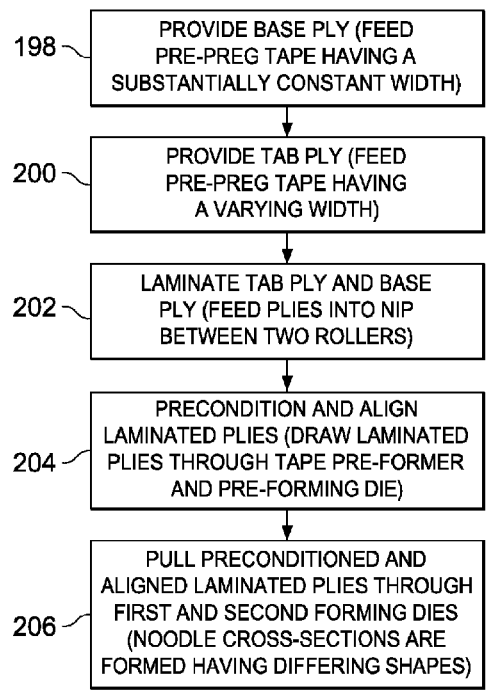
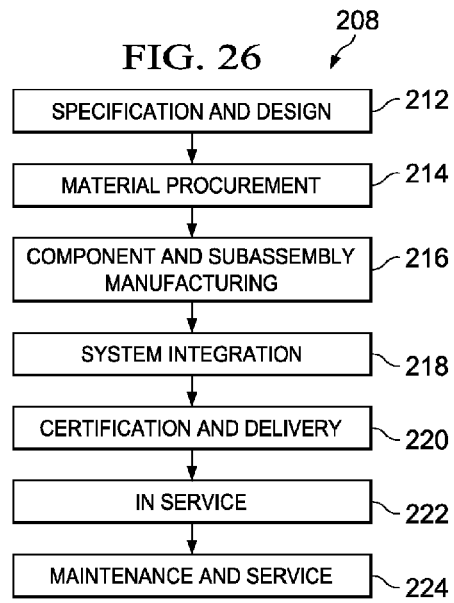
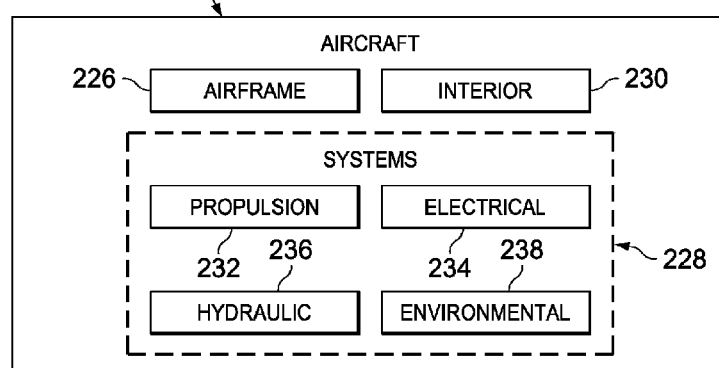

AUTOMATED FABRICATION OF COMPOSITE FILLERS

CROSS REFERENCE TO RELATED APPLICATIONS

This application is a divisional application of U.S. application Ser. No. 14/045,270, filed Oct. 3, 2013, which is related to co-pending U.S. patent application Ser. No. 14/045,195 filed on Oct. 3, 2013, all of which are incorporated by reference herein in their entirety.

BACKGROUND INFORMATION

1. Field

The present disclosure generally relates to the fabrication of composite structures, and deals more particularly with a method and apparatus for automated fabrication of composite fillers used to fill a cavity between assembled composite members.

2. Background

Assembled composite structures sometimes contain cavities that must be filled in order to maximize the strength and/or rigidity of the structure. For example, two or more composite members with radiused edges may be assembled together such that their adjacent radiused edges form a radiused cavity. In order to fill the cavity and strengthen the structure, a pre-formed radius filler is placed in the cavity and bonded to the members.

Fillers, including radiused fillers used in primary aircraft structures such as I-beams and spars, must have tight dimensional specifications and a high level of both geometric accuracy and compaction in order to maximize structural strength and avoid resin pooling or the development of voids during part cure. Radius fillers may be fabricated by hand, however this production technique is time consuming, labor intensive and may yield radius fillers that are inconsistent, and/or do not meet required specifications.

Automated machines have been proposed for producing radius fillers using a pultrusion process in which prepreg unidirectional tape is continuously pulled through one or more forming dies which form the tape to the desired cross-sectional radius filler profile. However, these automated radius filler machines are not currently capable of producing radius fillers to stringent specifications for peak definition, even ply transitions, symmetry and the absence of loose fibers. These deficiencies are caused, in part, by inadequate pre-conditioning and/or poor forming die design.

Further problems may be encountered during automated pultrusion of variable radius fillers which have cross-sectional profiles that vary along their length. A pultruded varying cross sectional profile requires the use of composite tape having a width that changes at transition points forming "tabs" along one edge of the tape. Although a portion of the width of the tape is held in tension during the pultrusion process, the remaining portion containing the tabs is not tensioned, and thus "droops". The inability to tension and integrate the tabs into the filler leads to uneven ply transitions and fiber distortions created by the interaction of the leading edge of the tabs with forming die surfaces, both of which may affect radius filler quality. Additionally, the existence of tabs along the edge of the radius filler results in asymmetry which create problems when installed.

Accordingly, there is a need for a method and apparatus for producing composite radius fillers for high-performance applications that improve part-to-part uniformity and consistency. There is also a need for a method and apparatus to improve the surface finish, dimensions, cross sectional profile and integration of tabs in variable composite radius fillers.

SUMMARY

The disclosed embodiments provide a method and apparatus of producing composite radius fillers suitable for use in high-performance composite structures. The radius fillers are produced using a continuous pultrusion process in which prepreg composite tape is pulled through one or more forming dies. Radius fillers can be reliably produced having consistent cross-sectional profiles with better dimensional control, good quality compaction, and smooth surface finishes. Improved radius filler quality is achieved by pre-conditioning the prepreg tape before it enters the forming dies.

According to one disclosed embodiment, apparatus is provided for making a composite filler having a desired cross-section. The apparatus comprises at least a first prepreg tape feed for feeding a first composite prepreg tape, at least one forming die through which the composite prepreg tape may be drawn into the desired cross-section. The apparatus also includes a prepreg tape pre-conditioning section for pre-conditioning the prepreg tape. The prepreg tape pre-conditioning section includes a prepreg tape former, and a prepreg tape lead-in die located between the preformer and the forming die.

According to another disclosed embodiment, apparatus is provided for pultrusion of a composite radius filler having a cross-section that varies along its length. A first tape feed feeds a first composite prepreg tape ply that includes at least first and second widths forming at least one tab therebetween. A second tape feed feeds a second composite prepreg base ply, and a laminator laminates the tab ply and the base ply together. A pre-forming section is provided for preforming the laminated tab and base plies. A forming section forms the pre-formed tab and base plies into cross-sections of differing shapes along the length of the radius filler.

According to a further disclosed embodiment, a method is provided of making a composite radius filler. A base ply is provided by feeding composite prepreg tape having a substantially constant width, and a tab ply is provided by feeding composite prepreg tape having a varying width. The base and tab plies are laminated together and then drawn through at least first and second forming dies to form different cross-sectional shapes of the radius filler.

The tape pre-conditioning is achieved using a peak former, a preformer and a pre-forming lead in die, each of which may be fabricated using a wear resistant, low friction material. The peak former, preformer and pre-forming lead in die gradually pre-form the tape into a cross-sectional shape that is a rough approximation of the final desired radius filler cross-section, thereby reducing the possibility of fibers being torn from the tape during pultrusion through the forming dies. These improvements lead to better consolidation of the radius filler and an improvement in filler cross-sectional geometry, including improved peak definition, improved symmetry, and improved overall profile.

The peak former includes a V former and inverted V former shaped preformer that forces the apex to form the peak. The peak former is located between the heater box and the triangular preformer. The triangular preformer includes a tapered conical opening that gradually transitions into an oversize radius groove, into which prepreg tape is pultruded through. The triangular preformer is located between the peak former and the pre-forming lead in die. The preforming lead in die includes an upper die body, a lower die body, and a die insert mounted on the upper die body. The die insert has a radiused front leading edge that helps gradually transition the prepreg tape material into the lead in die. The lower die body contacts the upper die insert forming the base of the radius filler. When in contact with each other, the die insert and lower die body create an aperture through which the composite tape is pulled to form it in a cross-section that is slightly larger than the final desired cross-section. The pre-forming lead in die is located between the triangular preformer and the first forming die.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 14 is an illustration of the exiting end of the preformer.

FIG. 15 is an illustration of a bottom view of the preformer.

FIG. 16 is an illustration of a diagrammatic view of the profile of the laminate radius filler after passing through the preformer shown in FIGS. 12-14, the outline of the radius filler being indicated by a broken line.

FIG. 25 is a flow diagram showing the overall steps of a method of making a composite radius filler according to the disclosed embodiments.

FIG. 26 is an illustration of a flow diagram of aircraft production and service methodology.

FIG. 27 is an illustration of a block diagram of an aircraft.

DETAILED DESCRIPTION

Figure 1:
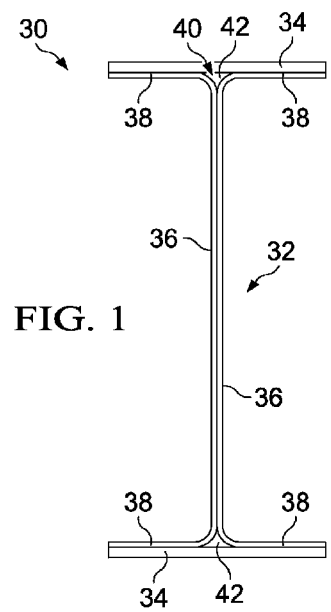
FIG. 1 is an illustration of an end view of a composite I-beam employing a radius filler produced in accordance with the disclosed embodiments.
Figure 2:
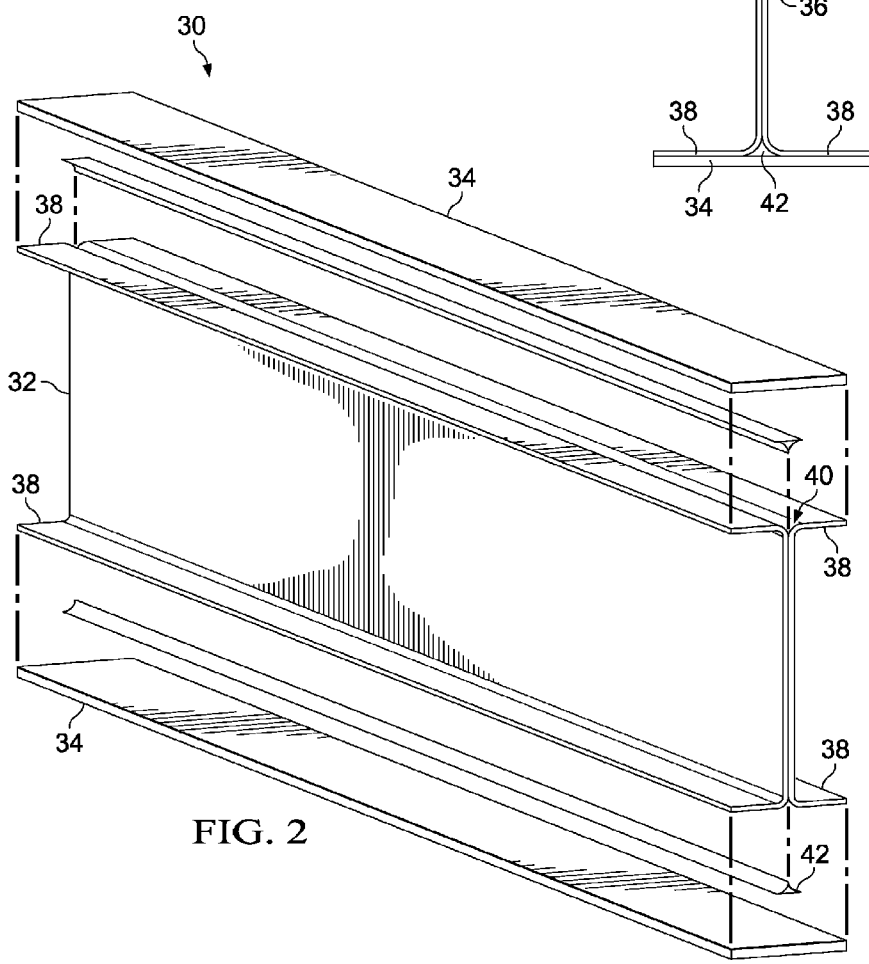
FIG. 2 is an illustration of an exploded, perspective view of the I-beam shown in FIG. 1.
Figure 3:
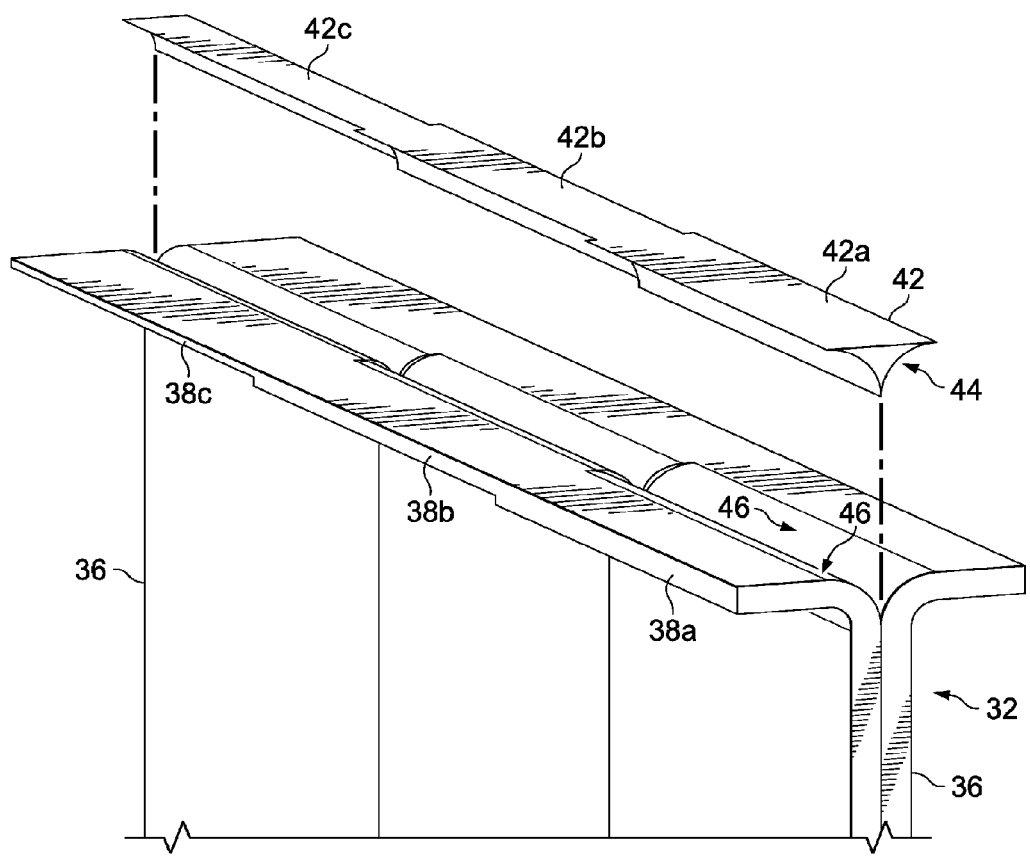
FIG. 3 is an illustration of a perspective view of a portion of the I-beam shown in FIG. 1, a radius filler of varying cross-section about to be placed in a joint in the I-beam.

The disclosed embodiments relate to a method and apparatus for producing high-performance composite fillers, sometimes referred to hereinafter as "radius fillers", The radius fillers may be used to strengthen primary composite structures and assemblies, such as the composite laminate I-beam 30 shown in FIGS. 1, 2 and 3. The I-beam 30 comprises upper and lower composite laminate caps 34 joined by a web 32. The I-beam 30 may be produced by joining a pair of C-shaped, composite laminate members 36 having outwardly turned flanges 38, each of which transitions to the web 32 through a radiused corner 46.

The area between adjacent radius corners 46 and a cap 34 forms a void 40 that may be filled by a radius filler 42 produced in accordance with the disclosed embodiments described below. In the illustrated embodiment, the gauge or thickness of the C-shaped members 36 varies along its length, consequently, different sections 38a, 38b, 38c of the flanges 38 have differing thicknesses. Due to these varying thicknesses, the radius of the corners 46 also varies.

The radius filler 42 may comprise, without limitation, prepreg tape, such as carbon fiber epoxy, that is folded, formed and compacted into the desired cross-sectional profile, continuously along the length of the radius filler 42. In the illustrated embodiment, due to the presence of the radiused corners 46, the radius filler 42 possesses matching inside radii 44 and may therefore be referred to as a "radius filler", however it is to be understood that the disclosed embodiments may be employed to produce fillers having a wide variety of other cross-sectional shapes. The cross-sectional profile of the radius filler 42 may vary along its length to match the changing gauge of the C-shaped members 36. Thus, in the example shown in FIG. 3, the radius filler comprises three sections 42a, 42b, 42c which respectively have cross-sectional profiles that match the shape of the groove or void 40 present between the flanges 38 and the caps 34.

Figure 4:
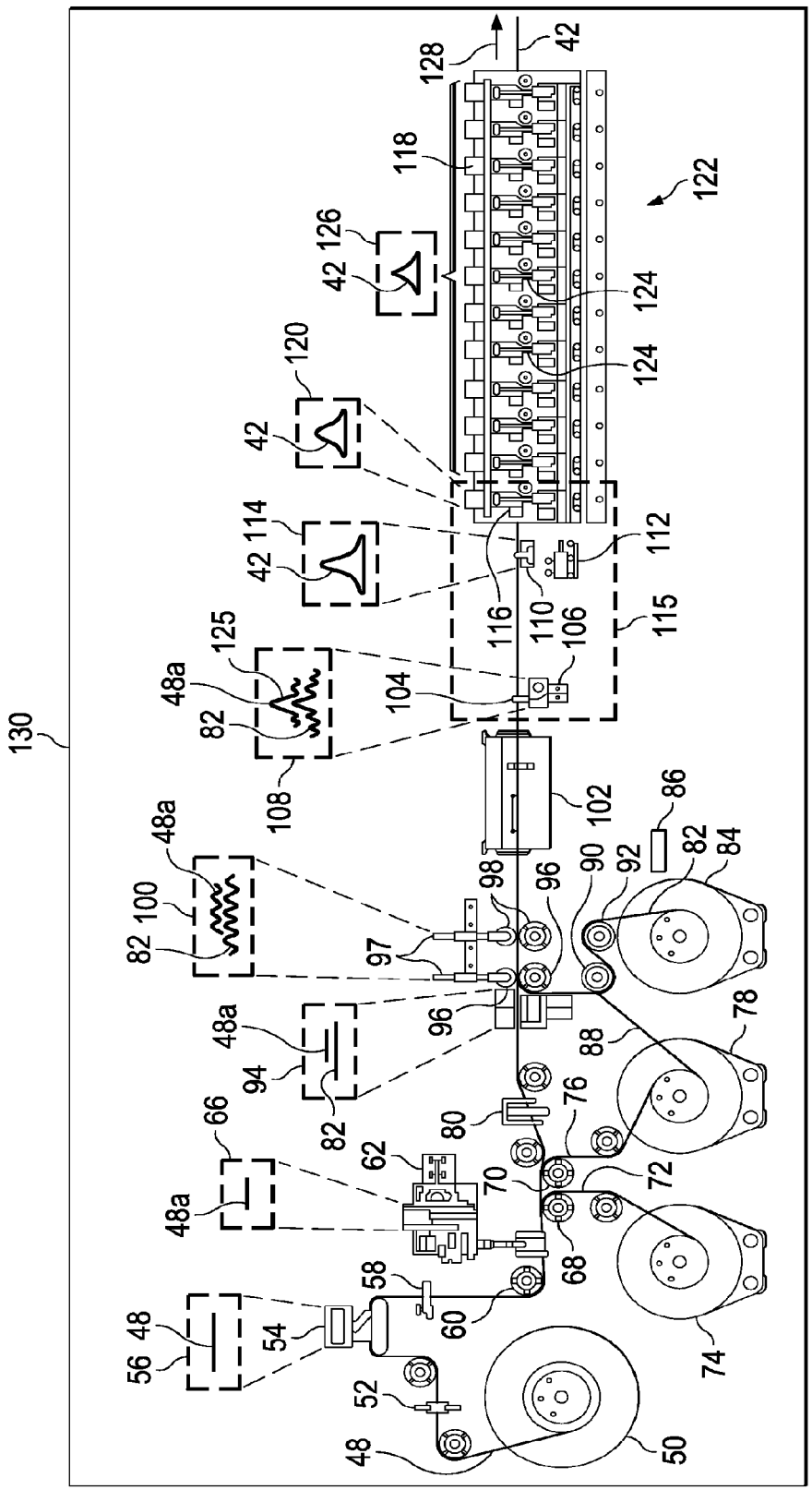
FIG. 4 is an illustration of a combined schematic and diagrammatic view of apparatus for producing a composite radius filler.

The radius filler 42 may be fabricated using a pultrusion apparatus generally illustrated in FIG. 4. Broadly, first and second prepreg tape feeds 50, 84 supply prepreg tape 48 which form a tab ply 48a and a base ply 82 that are laminated together, pre-conditioned, aligned and then pulled by a puller (not shown) continuously through a set of forming dies 124, all mounted on a machine frame 130, before exiting the apparatus at 128, as a continuous radius filler 42. A cutter (not shown) cuts the continuous radius filler 42 to the desired length.

More particularly, composite prepreg tape 48 drawn from the first tape feed 50 is delivered through a splice detector 52 and then through an alignment station 54 that transversely aligns the tape 48. The width of the tape 48 and its transverse alignment is shown at 56 after passing through the alignment station 54. The tape 48 then passes through a web alignment sensor 58 which senses and verifies alignment of the tape 48. The tape 48 is looped around a web tension transducer 60 which senses the tension in the tape 48 before being fed to a tape slitter 62. The tape slitter 62 may comprise, for example and without limitation, an ultrasonic knife which continuously cuts the tape to one or more desired widths, depending upon the varying cross-sectional profile of the radius filler 42.

As the tape slitter 62 cuts the tape 48 to various widths, tabs 93, 95 (see FIG. 7) are formed along the outer edge of the tape 48 which form transitions between differing sections of the tape 48 that have different widths. The tape 48 having the desired tape profile cut by the slitter 62 forms a tab ply 48*a* (discussed later in more detail) and shown at 66. The portion of the tape 48 that is cut away by the tape slitter 62 is fed as a tape scrap 72 to a scrap take-up reel 74. Additionally, a backing paper 76 may be drawn off of the tab ply 48*a* and onto a paper take-up spool 78.

The tab ply 48*a* having the desired cut width passes across a pair of web tension transducers 68, 70 and across a web width sensor 80 which senses the width, and thus the profile, of the tab ply 48*a*. A second tape feed 84, which may comprise a spool of composite prepreg tape, delivers tape forming a base ply 82 of constant width over a roll 92. Backing paper 88 from the base ply 82 is passed over a roll 90 and is drawn onto the paper take-up spool 78. The tab ply 48*a* along with the base ply 82, are fed in stacked relationship, as shown at 94 into a nip 105 (FIG. 5) between two laminating rollers 96. The laminating rollers 96 press and thereby laminate the tab ply 48*a* and base ply 82 together. The laminated plies 48*a* and 82 then pass through a pair of corrugated rollers 98 which form corrugations in the laminate, as shown at 100. The corrugated laminate passes through a heater box 102 which heats and softens the laminate to a suitable forming temperature.

The corrugated laminate is then pulled through a pre-conditioning section 115, comprising a peak former 104 mounted on a support 106, a preformer 110 mounted on a base 112, and a pre-forming lead in die 116. The pre-conditioning section 115 functions to both pre-align and pre-form the heated laminate (i.e. tab ply 48*a* and base ply 82), such that the laminate is pre-formed into a profile shape that is substantially similar to, but larger in size than the finished radius filler 42.

The pre-conditioning section 115 reduces the amount of forming work that must be later performed by forming dies 124 (discussed below) in order to create the final radius filler profile, and leads to improved consolidation of the radius filler 42, as well as an improvement in the radius filler cross-sectional geometry, including peak definition, peak symmetry and overall profile. Moreover, pre-conditioning and alignment of the heated laminate prior to forming reduces the possibility that reinforcing fibers in the laminate will be torn from the surface of the radius filler 42 when the laminate is being pultruded through the forming dies 124. It should be noted here that while a single pre-forming lead in die 116 is employed to pre-form the laminate prior to being drawn into the forming section 122, in some embodiments, it may be necessary or desirable to employ a second pre-forming lead in die (not shown) downstream of the forming section 122 in order to further pre-form the laminate and assist in maintaining alignment of the radius filler 42 as it is being drawn through the dies 124.

The peak former 104 reduces the width, rolls the edges upward and toward centerline and forms a peak 125 in the corrugated laminate, as shown at 100. The laminate then is drawn through the tape preformer 110 which is mounted on a base 112. The tape preformer 110 collimates the laminate into the general shape of the radius filler 42, which in the illustrated example is a generally triangular shape, as shown at 114. Next, the collimated laminate is pulled through a pre-forming lead in die 116 which forms the laminate into a cross-sectional profile that has substantially the same shape as, but is larger in dimension than the finished radius filler 42. After passing through the pre-forming lead in die 116, the nearly-formed-to-shape laminate is pultruded through the forming section 122 which comprises one or more forming dies 124. In the illustrated example, eleven forming dies 124 are employed, however more or less than eleven forming dies 124 may be employed, depending upon the particular radius filler 42 being formed.

In the case of radius fillers 42 having cross-sectional shapes that vary along their lengths, the forming dies 124 have differently shaped openings and are selectively engaged with the pre-formed laminate by a corresponding pneumatic or electrical actuator 118 which opens and closes the forming die 124. As previously mentioned, although not shown in FIG. 4, after exiting 128 the forming section 122, the radius filler 42 is cut to a desired length by a cutter. The peak former 104, preformer 110 and pre-forming lead in die 116 remain engaged with the laminate throughout pultrusion of the radius filler through the forming dies 124 in the forming section 122.

Figure 5:
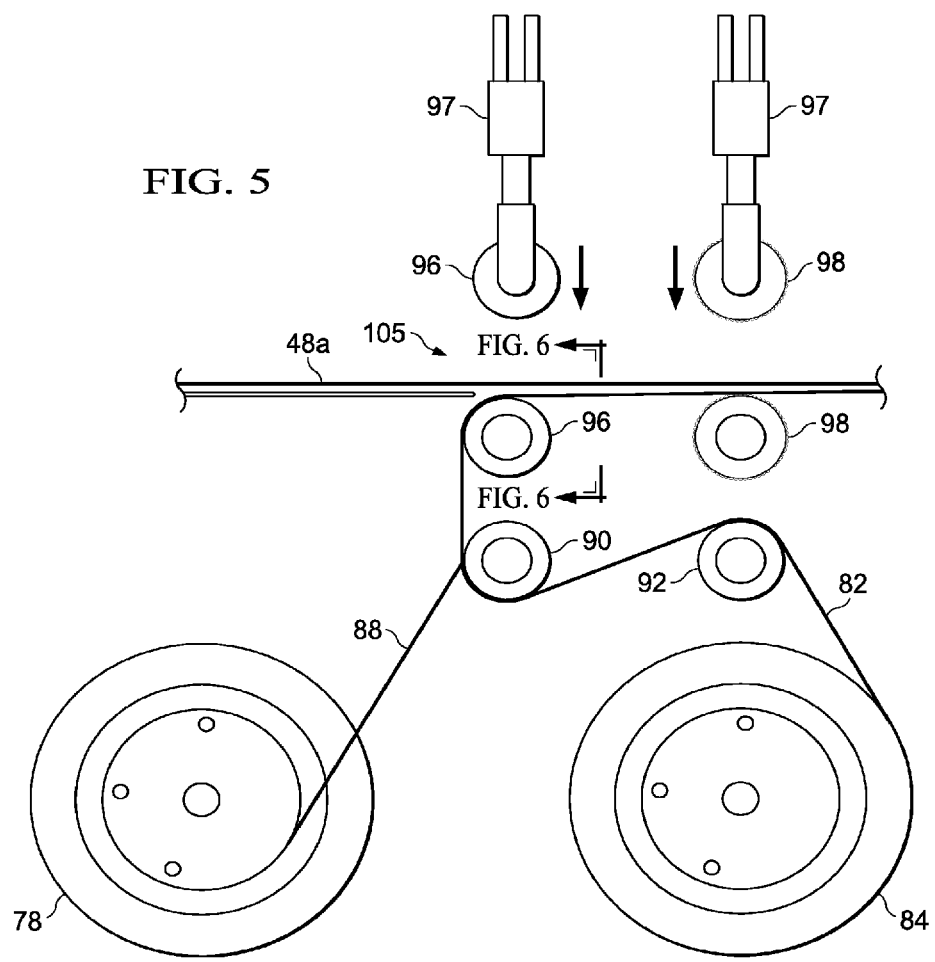
FIG. 5 is an illustration of a diagrammatic view of a portion of the apparatus shown in FIG. 4, better showing lamination of a tab ply onto a base ply.
Figure 6:
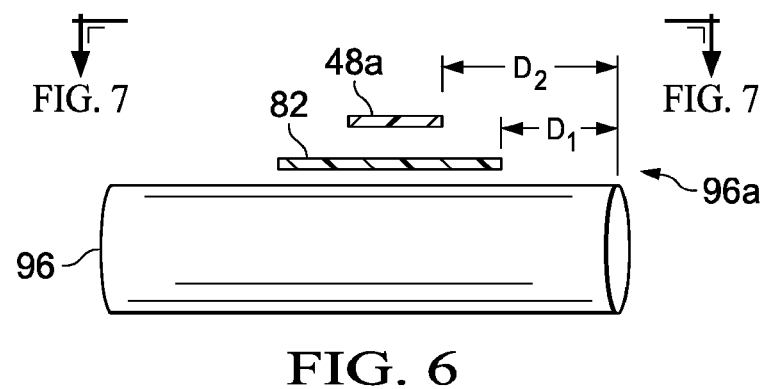
FIG. 6 is an illustration of a cross-sectional view taken along the line FIG. 6-6 in FIG. 5.
Figure 7:
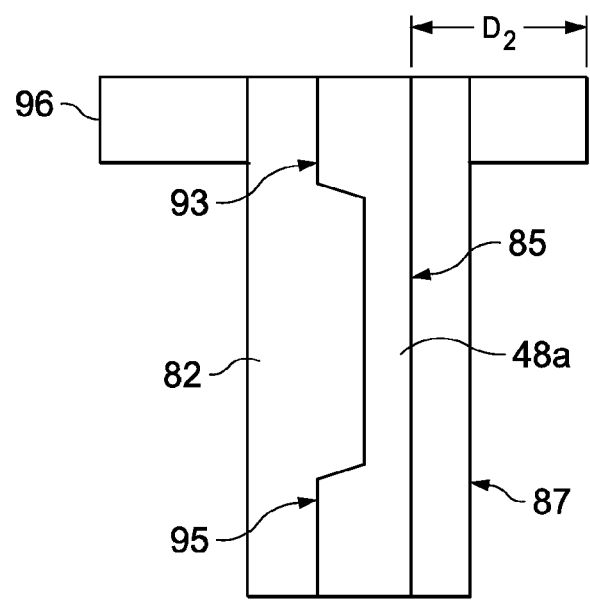
FIG. 7 is an illustration of a plan view taken in the direction shown as FIG. 7 in FIG. 6
Figure 8:
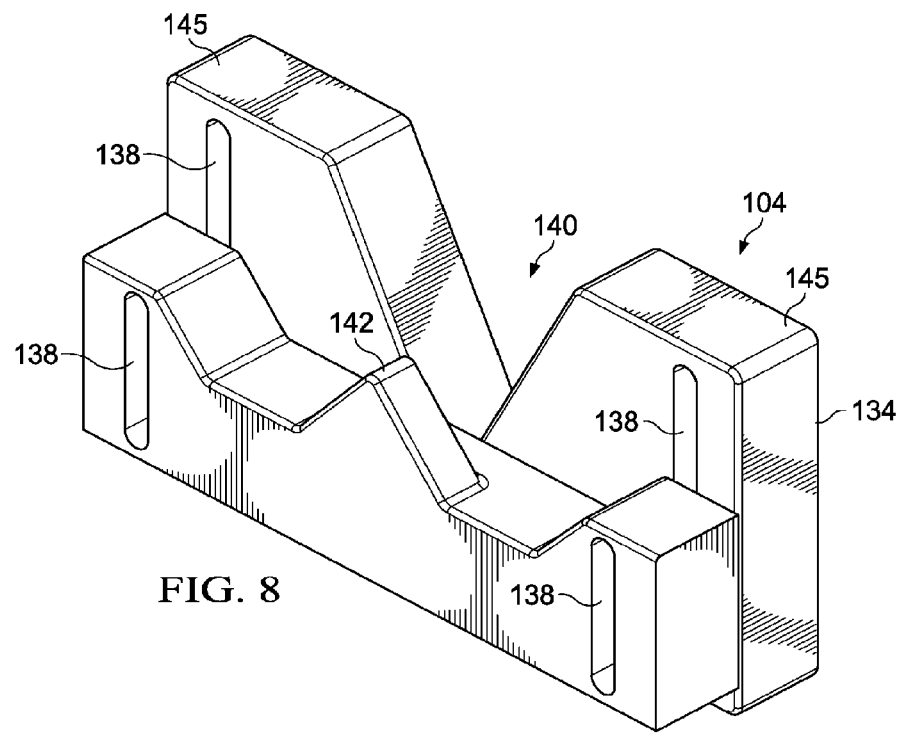
FIG. 8 is an illustration of an isometric view of a peak-former.
Figure 9:
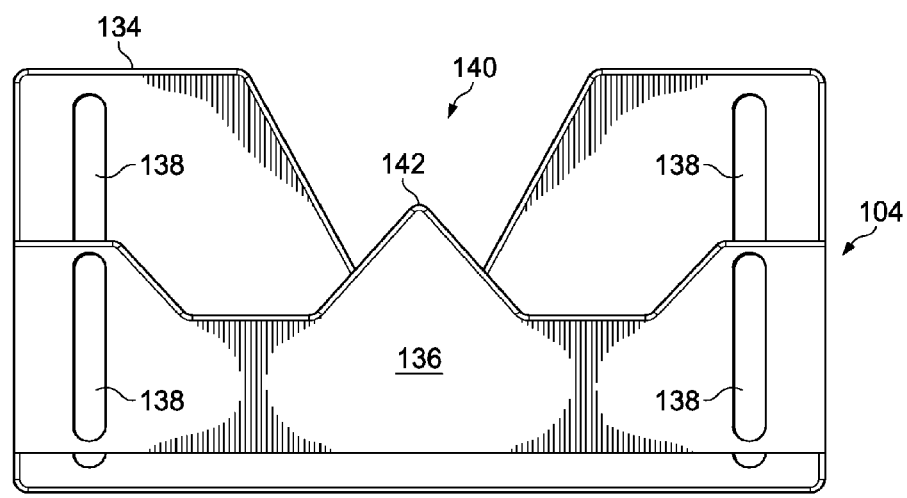
FIG. 9 is an illustration a front view of the peak-former shown in FIG. 8.
Figure 11:
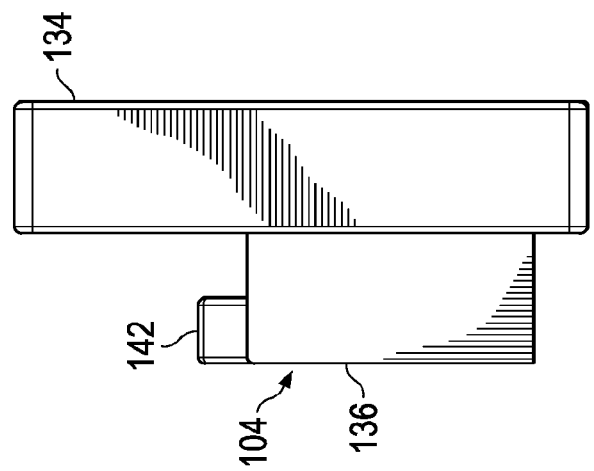
FIG. 11 is an illustration of the right side of the peak-former.
Figure 10:
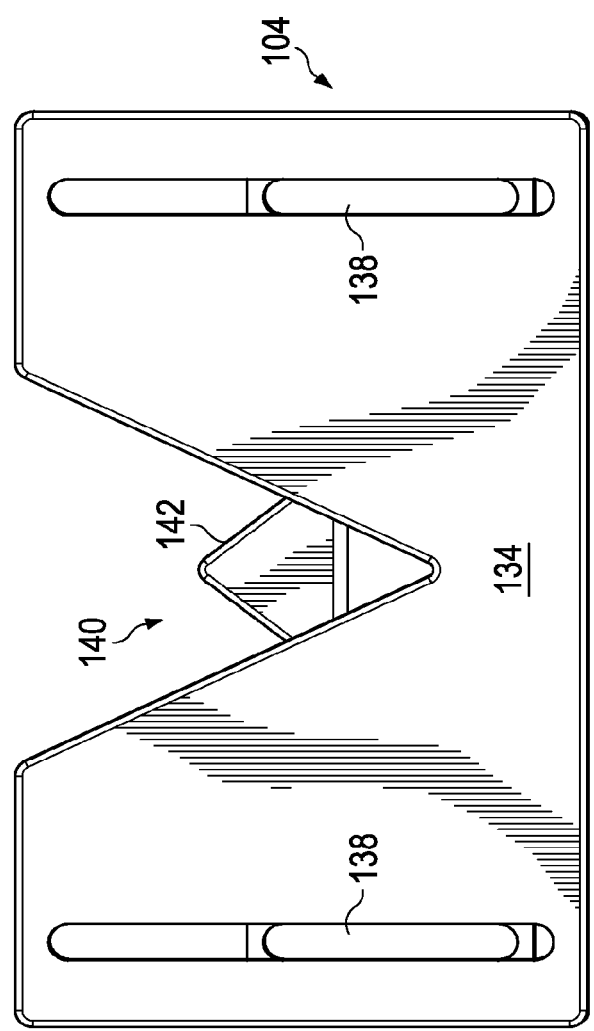
FIG. 10 is an illustration of a rear view of the peak-former.
Figure 13:
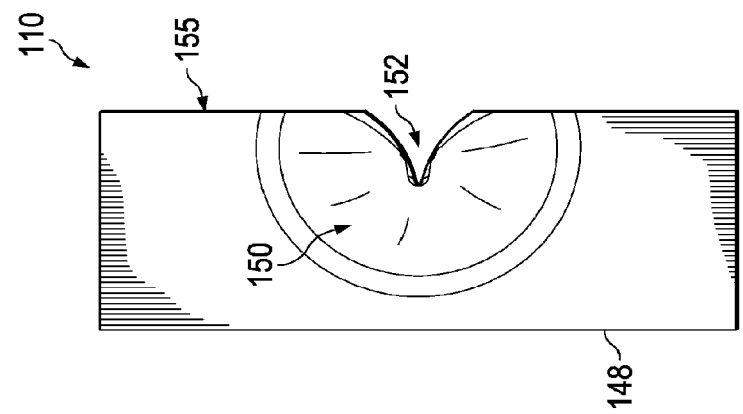
FIG. 13 is an illustration of the upstream end of the preformer.
Figure 12:
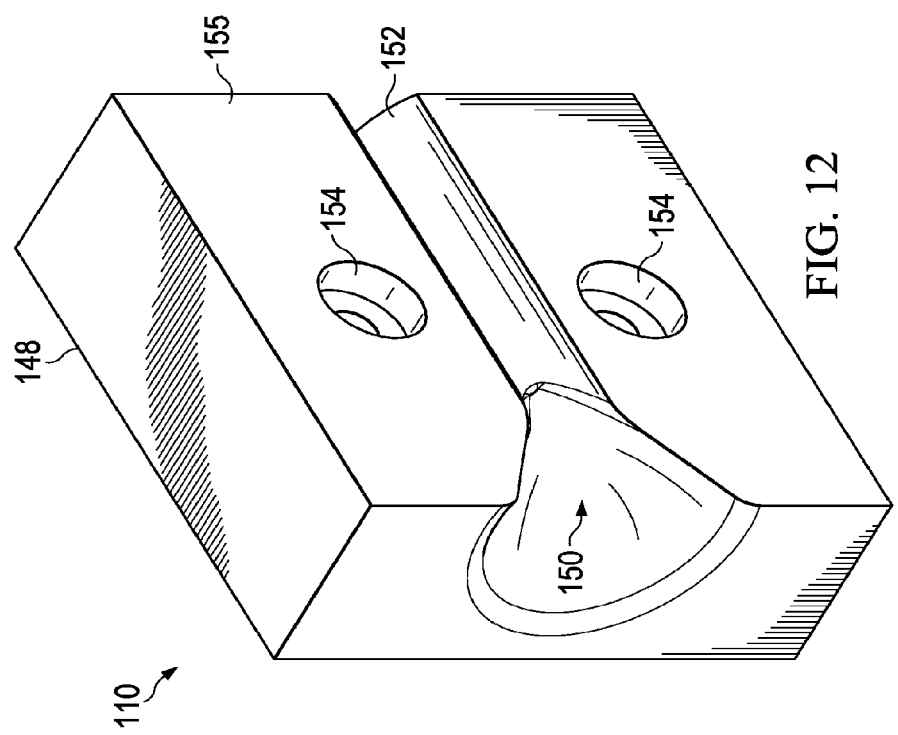
FIG. 12 is an illustration of a perspective view of a preformer.
Figure 17:
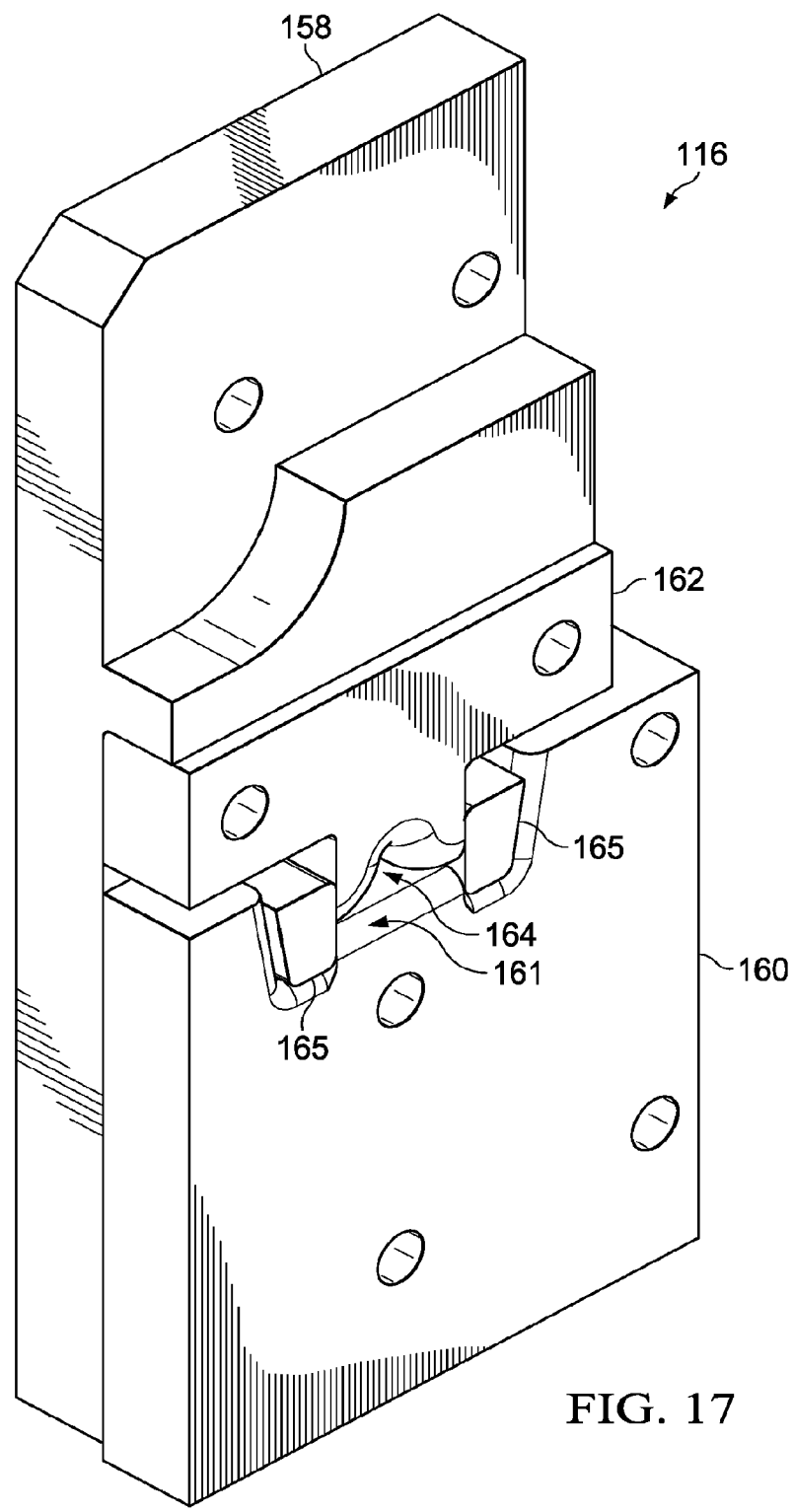
FIG. 17 is illustration of a perspective view of a pre-forming lead in die which forms part of apparatus shown in FIG. 4.
Figure 18:
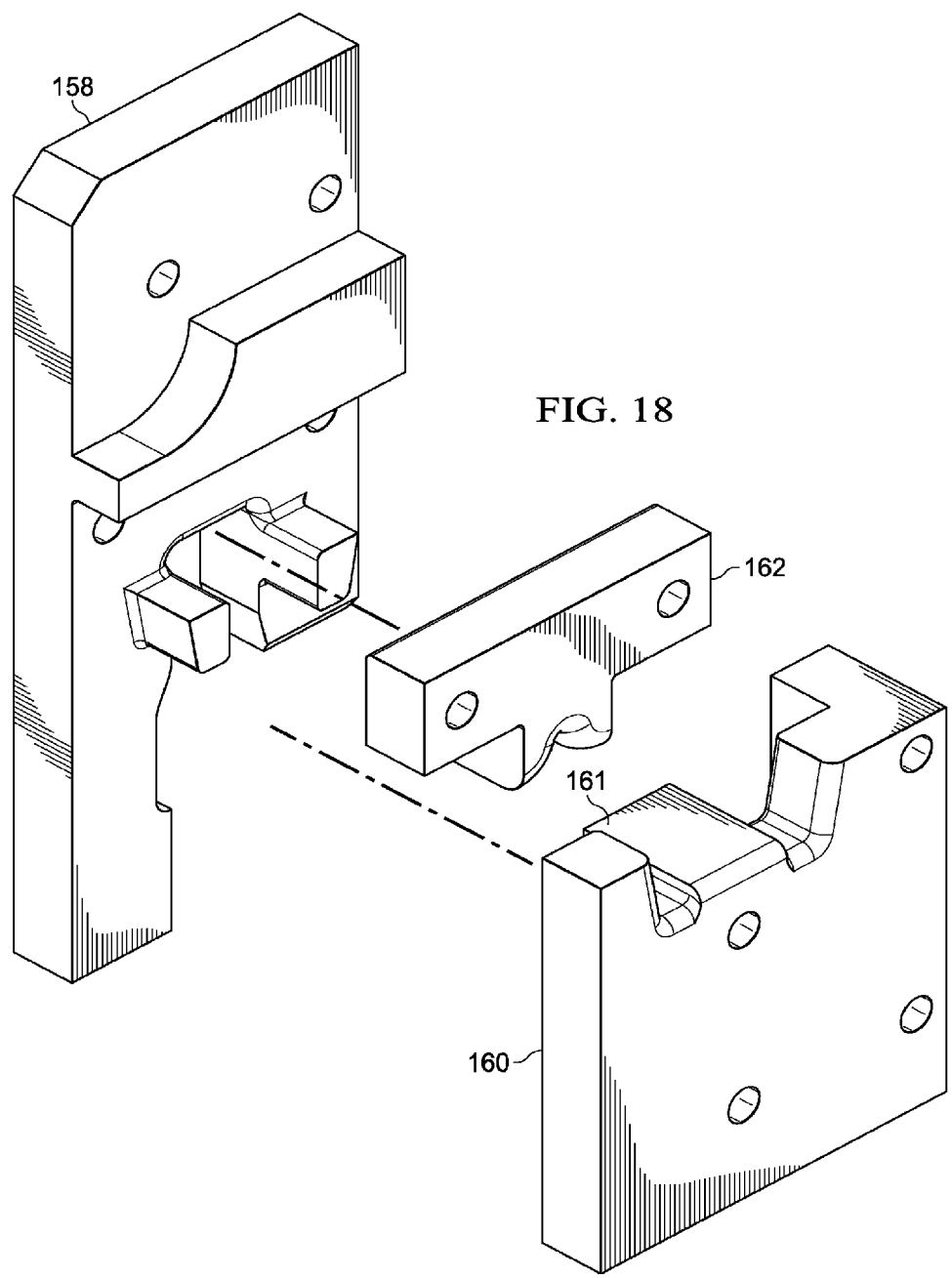
FIG. 18 is an illustration similar to FIG. 17, but showing the component parts of the pre-forming lead in die exploded.
Figure 19:
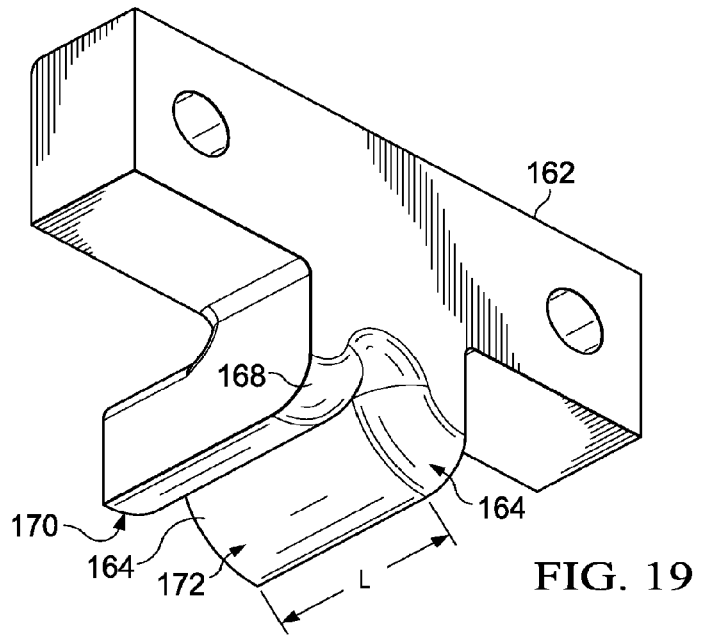
FIG. 19 is illustration of a perspective view of the front of the upper die insert of the pre-forming lead in die.
Figure 20:
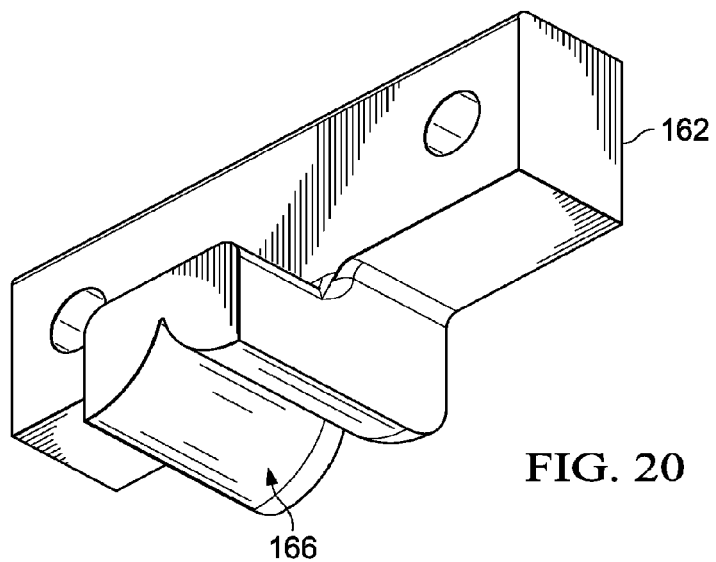
FIG. 20 is illustration of a perspective view of the rear of the upper die insert.
Figure 21:
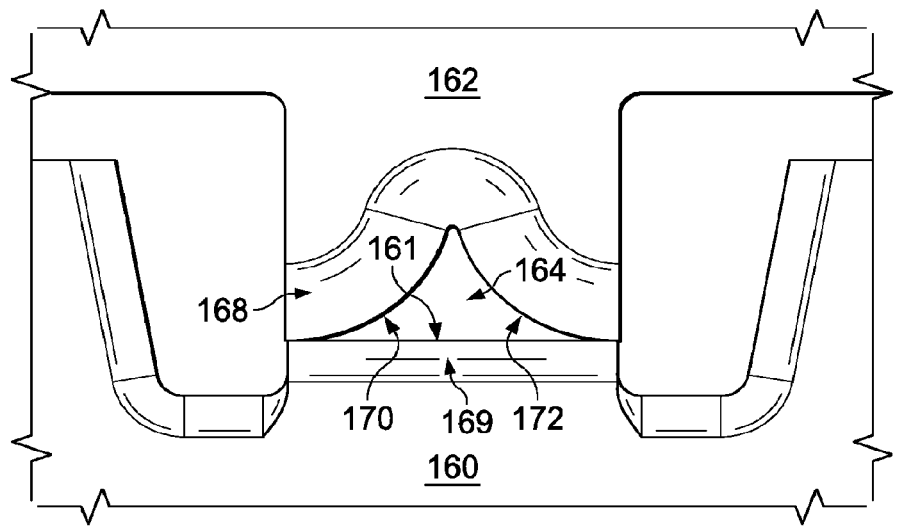
FIG. 21 is an illustration of an elevational view better showing the front of the die opening in the pre-forming lead in die.
Figure 22:
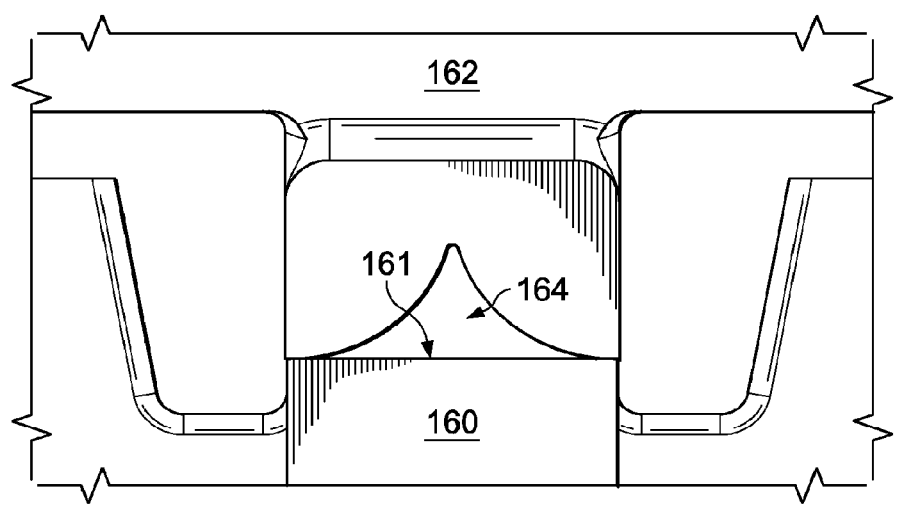
FIG. 22 is an illustration of an elevational view better showing the rear of the die opening of the pre-forming lead in die.

Attention is now directed to FIGS. 5, 6 and 7 which diagrammatically illustrate a technique for improving the quality of the finished radius filler 42 by laminating the variable width tab ply 48*a* onto the constant width base ply 82. Lamination of the tab ply 48*a* onto the underlying base ply 82 better integrates the tabs 93, 95 into the radius filler 42, eliminating surface discontinuities and reducing fiber tear-out at transitions between variable cross-sections on the radius filler 42. As previously discussed, the tab ply 48*a* and the base ply 82 are fed together into a nip 105 between a pair of laminating rollers 96 which may be closed to compress and thereby laminate the tab and base plies 48*a*, 82 together. The inside edge 85 of the tab ply 48*a* may be offset relative to the inside edge 87 of the base ply 82. In the illustrated embodiment, the inside edge 85 of the tab ply 48*a* is offset a distance $D_2$ from the inner edge 96*a* of the lamination rollers 96 that is greater than the offset distance $D_1$, thereby bringing the centerline of the tab ply 48*a* closer to the centerline of the base ply 82. In other embodiments however, depending on application, $D_2$ may be equal to or less than $D_1$.

The variable width tab ply 48*a* is placed on the constant width base ply 82 such that the constant width base ply supports each tab 93, 95 of the tab ply 48*a* and holds these tabs 93, 95 in tension throughout the forming process. In other words, the base ply 82 acts as a carrier that supports those portions of the tab ply 48*a*, i.e. the tabs 93, 95, that are not held in tension. Because the base ply 82 acts as an underlying supporting carrier, drooping or sagging of the tabs 93, 95 which leads to uneven surfaces at transitions between different radius filler cross-sections is eliminated.

Also, because the edges of the tabs 93, 95 are no longer exposed when travelling through the forming dies 123 in the forming section 122, fiber tear-out at cross-section transitions is greatly reduced.

FIGS. 8-11 illustrate additional details of the peak former 104. The peak former 104 broadly comprises a V-former 134 and an inverted V-former 136 arranged back-to-back such that the laminate first engages and is formed by the inverted V-former 136 and is then formed by the V-former 134. The inverted V-former 136 includes an inverted V or apex 142 that forms the peak 125 (see FIG. 3) into the laminate. The V-former 134 includes a V-shaped recess 140 that rolls the edges of the corrugated laminate up and toward centerline to ensure that they are in the interior of the finished radius filler 42 and are not left exposed on the outside surface. The inverted V-former 136 and the V-former 134 may each include slots 138 which receive fasteners (not shown) for mounting the peak former assembly 104 on a support 106 (FIG. 3) in such a way that the alignment between the two components may be adjusted. Each of the V-former 134 and the inverted V-former 136 may be fabricated from a low friction, wear resistant material such as, for example and without limitation, an ultra high molecular weight polyethylene (UHMWPE).

Referring now to FIGS. 12-15, the preformer 110 comprises a body 148 having a generally conical, tapered inlet opening 150. The tapered inlet opening 150 has a generally arcuate outer periphery and transitions into an over-sized radiused pre-forming groove 152 in one face 155 thereof. The pre-forming groove 152 has a cross section that generally approximates the final cross section of the radius filler. The pre-forming groove 152 is downstream of the tapered inlet opening 150 and, in the illustrated embodiments, has a generally triangular cross-sectional shape, although other cross sectional shapes are possible, depending on the geometry of the filler 42. The body 148 may be fabricated from a low friction, wear resistant material such as, for example and without limitation, an ultra high molecular weight polyethylene (UHMWPE). The body 148 is adapted to be mounted by fasteners (not shown) on a flat surface of the base 112 (see FIG. 3). The tapered inlet opening 150 collimates the laminate into the pre-forming groove 152 which pre-forms the laminate into a cross-sectional shape that is generally triangular FIG. 16 diagrammatically illustrates a radius filler 42 after having been pulled through the preformer 110 shown in FIGS. 12-14. The tab ply 48a, and the base ply 82 can be seen to have been compressed to form radius sides 137, and a substantially flat base 139 of the radius filler 42 generally matching the profile (shown in broken lines) of the radius filler 42. The peak 101 into which the laminated tab ply 48a and base ply 82 previously formed by the peak former 104 can be seen to have filled the apex area 141 of the radius filler 42.

FIGS. 17-22 illustrate the pre-forming lead in die 156 in more detail. The pre-forming lead in die 116 broadly comprises an upper, main die body 158, a lower die 160, an upper die insert 162, secured together by any suitable means, such as fasteners (not shown). Each of the upper die body 158, lower die 160 and the die insert 162 may be fabricated from a low friction, wear resistant material such as, for example and without limitation, an ultra high molecular weight polyethylene (UHMWPE).

The upper die body 158 includes a pair of spaced apart, forwardly projecting locator supports 165 for locating the die insert 162 and for containing the composite laminate laterally as it is being pulled through the pre-forming lead in die 116. The lower die 160 includes a substantially flat die face 161 having a radiused leading edge 169.

As best seen in FIGS. 19-22, the die insert 162 includes a radiused leading edge 168 which tapers to a forming passageway 166 defined by a pair of radiused die faces 170, 172. Thus, the die faces 161, 170, 172 form a die inlet opening 164 that is radiused or tapered at its leading edges 161, 169 but transitions into a cross-sectional profile (passageway 166) that is substantially identical to, but is slightly larger in dimension than that of the final cross-sectional profile of the radius filler 42. The die forming passageway 166 has a length L that is sufficient to allow enough contact between the laminate and the pre-forming lead in die 116 such that the laminate is substantially fully formed into the final pre-form radius filler cross-sectional profile upon exit from the preforming die 116, before entering one or more of the forming dies 124, where the radius filler 42 is formed to its final profile shape and dimensions. Passageway 166 may be tapered or of constant cross-section, depending on the particular filler 44 being produced.

Figure 23:
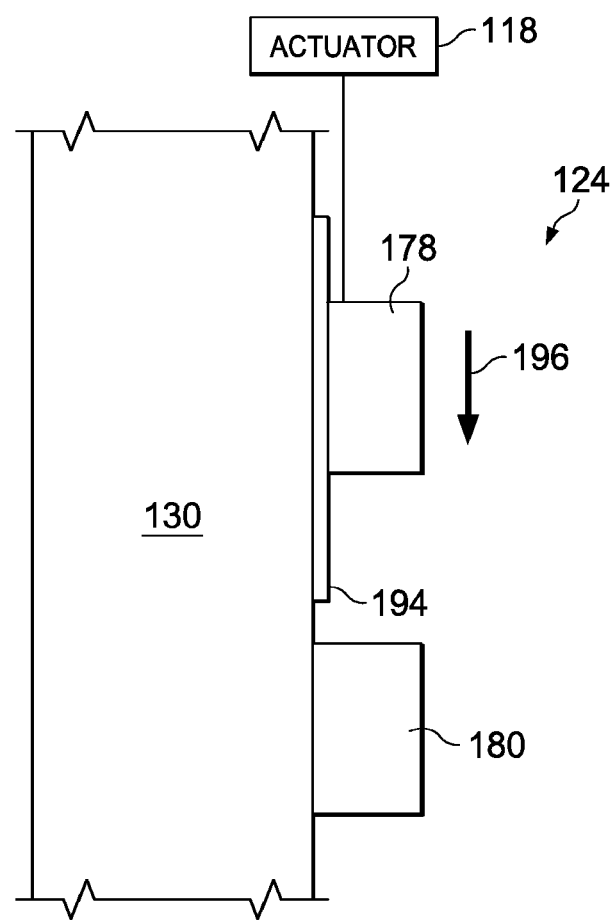
FIG. 23 is an illustration of a schematic side view of one of the forming dies shown in FIG. 4.
Figure 24:
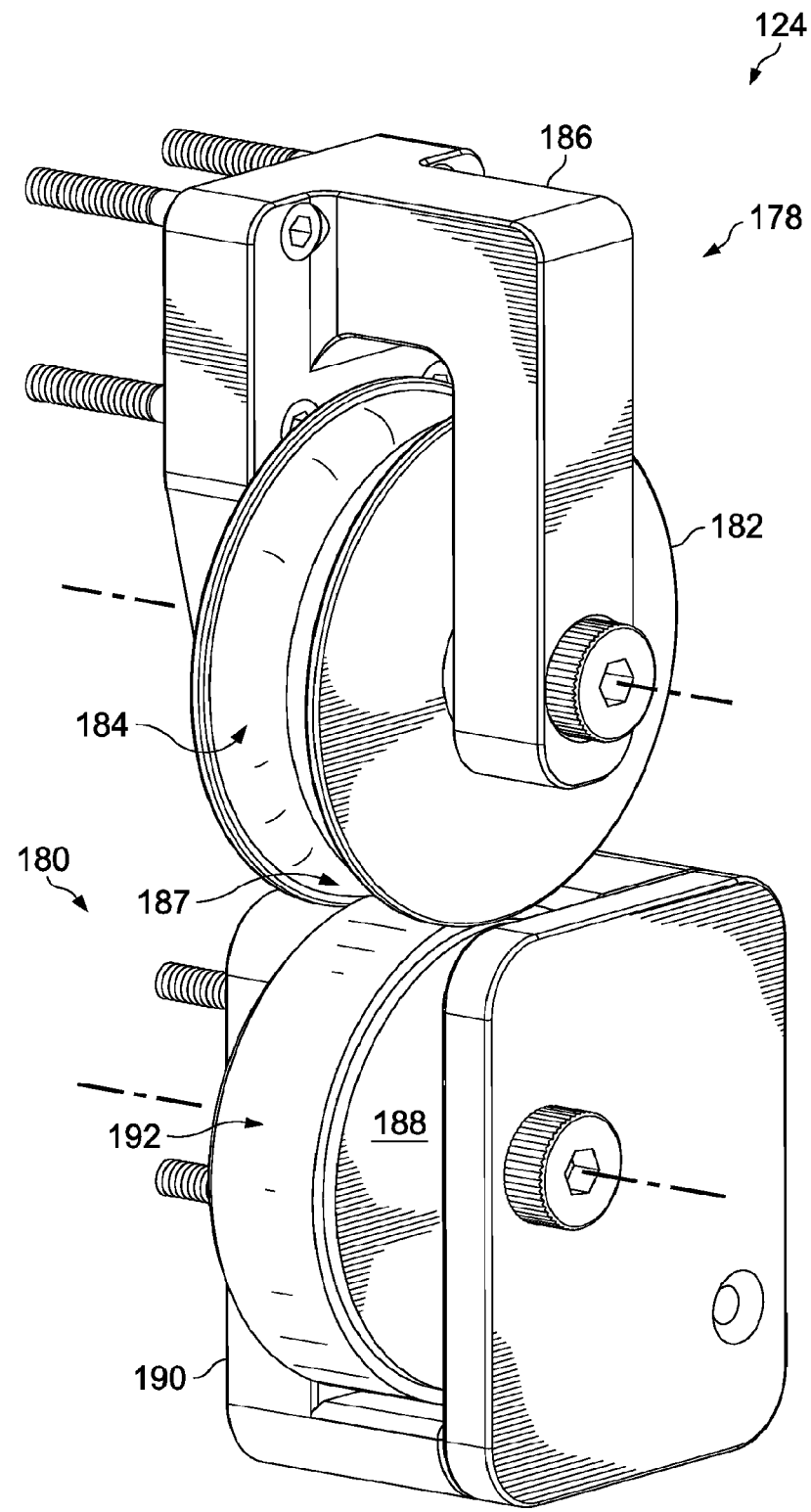
FIG. 24 is an illustration of an isometric view of the forming die shown in FIG. 23.

Attention is now directed to FIGS. 23 and 24 which illustrate one of the dies 124 mounted on the machine frame 130. The die 124 broadly comprises an upper roller die assembly 178 and a lower roller die assembly 180 between which the pre-formed composite laminate is formed into the desired radius filler 42. The upper and lower roller die assemblies 178, 180 are mounted on the machine frame in indexed relationship to each other to form a die opening therebetween 187 having a desired orientation relative to the movement of the laminate through the die 124. The upper roller die assembly 178 is mounted on a guide rail 194 for movement 196 toward and away the lower roller die assembly 180, between an open, standby position (shown in FIG. 23) and an operative forming position (shown in FIG. 24). The guide rail 194 is secured to the machine frame 130 by any suitable means. The lower roller die assembly 180 is stationarily fixed to the machine frame 130. An actuator 118 is coupled with and controls the movement 196 of the upper die assembly 178 along the guide rail 194.

Referring particularly to FIG. 24, the upper roller die assembly 178 includes an upper roller die 182 that is journaled for rotation on an upper mount 186. Similarly, the lower roller die assembly 180 includes a lower roller die 188 journaled for rotation on a lower mount 190. The upper roller die 182 includes a grooved die face 184 having radii for forming a radiused portion of the radius filler 42, and the lower roller die 188 includes a flat die face 192 for forming the remaining, flat portion of the radius filler 42. Together, the grooved die face 184 and the flat die face 192 form a die opening 187 having a shape that substantially matches that cross-sectional shape or profile of the finished radius filler 42.

Attention is now directed to FIG. 25 which broadly illustrates the overall steps of a method of producing a composite filler radius filler 42, such as a radius filler that varies in cross-sectional profile along its length. Beginning at 198, a base ply 82 is provided, such as by feeding prepreg composite tape having a substantially constant width. At 200, tab ply 48a is provided, as by feeding prepreg composite tape having a varying width. At step 202, the tab ply 48a and the base ply 82 are laminated together, as for example by feeding the two plies into a nip 105 between two lamination rollers 96. At 204, the laminated plies 48a, are pre-conditioned and aligned in preparation for forming. The pre-conditioning and aligning may be accomplished by pulling the laminated plies through a peak former 104, tape preformer 110 and a pre-forming lead in die 116. Finally, at step 206, the pre-conditioned and aligned laminated plies are pulled through various forming dies 124 in order to form two or more different sections 42a, 42b of the radius filler 42 into differing cross-sectional profiles.

Embodiments of the disclosure may find use in a variety of potential applications, particularly in the transportation industry, including for example, aerospace, marine, automotive applications and other application where cavities that must be filled exist between composite members. Thus, referring now to FIGS. 26 and 27, embodiments of the disclosure may be used in the context of an aircraft manufacturing and service method 208 as shown in FIG. 26 and an aircraft airframe 226 as shown in FIG. 27. Aircraft applications of the disclosed embodiments may include, for example, without limitation, radius fillers used to fill radiused cavities in composite beams, spars and other stiffeners. During pre-production, exemplary method 208 may include specification and design 212 of the aircraft 210 and material procurement 214. During production, component and subassembly manufacturing 216 and system integration 218 of the aircraft 210 takes place. Thereafter, the aircraft 210 may go through certification and delivery 220 in order to be placed in service 222. While in service by a customer, the aircraft 210 is scheduled for routine maintenance and service 224, which may also include modification, reconfiguration, refurbishment, and so on.

Each of the processes of method 208 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 27, the aircraft 210 produced by exemplary method 208 may include an airframe 226 with a plurality of systems 228 and an interior 230. Examples of high-level systems 228 include one or more of a propulsion system 232, an electrical system 234, a hydraulic system 236 and an environmental system 238. Any number of other systems may be included. The disclosed method and apparatus may be employed to produce radius fillers used to fill radiused cavities in composite assemblies used in the airframe 226. Although an aerospace example is shown, the principles of the disclosure may be applied to other industries, such as the marine and automotive industries.

Systems and methods embodied herein may be employed during any one or more of the stages of the production and service method 208. For example, components or subassemblies corresponding to production process 216 may be fabricated or manufactured in a manner similar to components or subassemblies produced while the aircraft 210 is in service. Also, one or more apparatus embodiments, method embodiments, or a combination thereof may be utilized during the production stages 216 and 218, for example, by substantially expediting assembly of or reducing the cost of an aircraft 210. Similarly, one or more of apparatus embodiments, method embodiments, or a combination thereof may be utilized while the aircraft 210 is in service, for example and without limitation, to maintenance and service 224.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. Apparatus for making a composite filler having a desired cross-section, comprising:
   at least a first prepreg tape feed for feeding a first composite prepreg tape;
   at least one forming die through which the composite prepreg tape may be drawn into the desired cross-section; and
   a prepreg tape pre-conditioning section for pre-conditioning the prepreg tape, the prepreg tape pre-conditioning section including:
     a peak former for forming a peak in the first composite prepreg tape,
     a prepreg tape preformer, wherein the preformer includes a tapered conical opening that gradually transitions into a radiused groove having a first cross-section generally approximating a second cross section of the composite filler; and
     a prepreg tape lead in die located between the preformer and the forming die.

2. The apparatus of claim 1, wherein the preformer includes a tapered inlet opening into which prepreg tape is received.

3. The apparatus of claim 2, wherein the tapered inlet opening has an arcuate outer periphery, and the preformer further includes an elongate preforming groove coupled with and downstream of the tapered inlet opening.

4. The preformer of claim 3, wherein the preforming groove has a generally triangular cross sectional shape.

5. The apparatus of claim 1, wherein the lead in die includes:
   an upper die body,
   a lower die body, and
   a die insert mounted on the upper die body.

6. The apparatus of claim 5, wherein:
   the die insert includes a first die face for preforming a first portion of the filler,
   the lower die body includes a second die face for forming a second portion of the filler, and
   the first and second die faces forming a die opening through which the composite tape is drawn and preformed.

7. The apparatus of claim 6, wherein the first and second die faces extend longitudinally in a direction in which the composite tape is drawn toward the forming die and each has a length sufficient to preform the composite tape into a cross-sectional shape that is slightly larger than the desired cross-section.

8. The apparatus of claim 1, wherein the lead in die includes:
a radiused leading edge, and
a die passageway coupled with the radiused leading edge, wherein the radiused leading edge transitions to the die passageway and the die passageway has a cross sectional profile that is slightly larger than the desired cross-section.

9. The apparatus of claim 1, further comprising:
a second composite tape feed for feeding a second composite prepreg tape along with the first prepreg tape to the pre-conditioning section.

10. The apparatus of claim 9, further comprising:
a laminator for laminating the first and second tapes together, and
wherein the peak former is located between the laminator and the lead in die.

11. The apparatus of claim 1, wherein the preformer further comprises:
a main die body;
a second die connected to and below the main die with respect to gravity; and
a die insert connected to the main die body.

12. The apparatus of claim 11, wherein the main die body includes a pair of spaced apart, forwardly projecting locator supports for locating the die insert and for containing the composite radius filler laterally as the composite radius filler is pulled through the pre-forming section.

13. The apparatus of claim 12, wherein the second die includes a substantially flat die face having a radiused leading edge.

14. The apparatus of claim 13, wherein the radiused leading edge is tapered and transitions into a cross-sectional profile that is substantially identical to, but is slightly larger in profile, of the composite radius filler.

15. The apparatus of claim 1, wherein the at least forming die comprises:
a first die roller assembly mounted on a frame of the apparatus; and
a second die roller assembly mounted on the frame below the first die roller assembly relative to gravity and in an indexed relationship with the first die roller assembly, wherein the composite radius filler is formed into a desired shape between the first die roller assembly and the second die roller assembly.

16. The apparatus of claim 15, wherein the first die roller assembly is mounted on a guide rail secured the frame, the guide rail configured to move toward and away from the second die roller assembly.

17. The apparatus of claim 16, wherein the second die roller assembly is stationarily fixed to the frame.

18. The apparatus of claim 17 further comprising:
an actuator coupled with the first die roller assembly and configured to control movement of the first guide rail assembly along the guide rail, wherein the first die roller assembly includes a grooved die face having radii for forming a radiused portion of the composite radius filler, and wherein the second die roller assembly includes a flat die face for forming a remaining flat portion of the composite radius filler.

* * * * *